(12) United States Patent
Mittenthal

(10) Patent No.: US 7,292,693 B1
(45) Date of Patent: Nov. 6, 2007

(54) DETERMINISTICALLY GENERATING BLOCK SUBSTITUTION TABLES WHICH MEET A GIVEN STANDARD OF NONLINEARITY

(75) Inventor: Lothrop Mittenthal, Thousand Oaks, CA (US)

(73) Assignee: Teledyne Technologies Incorporated, Los Angeles, CA (US)

( * ) Notice: Subject to any disclaimer, the term of this patent is extended or adjusted under 35 U.S.C. 154(b) by 0 days.

(21) Appl. No.: 09/762,555

(22) PCT Filed: Aug. 13, 1999

(86) PCT No.: PCT/US99/18538

§ 371 (c)(1),
(2), (4) Date: Apr. 10, 2001

(87) PCT Pub. No.: WO00/10285

PCT Pub. Date: Feb. 24, 2000

Related U.S. Application Data

(60) Provisional application No. 60/096,535, filed on Aug. 13, 1998.

(51) Int. Cl.
  *H04L 9/00* (2006.01)
(52) U.S. Cl. .................................................. 380/263
(58) Field of Classification Search ............... 713/168, 713/700; 380/28, 44, 37, 255, 263
  See application file for complete search history.

(56) References Cited

U.S. PATENT DOCUMENTS

| | | | |
|---|---|---|---|
| 3,962,539 A | 6/1976 | Ehrsam et al. | |
| 4,316,055 A | 2/1982 | Feistel | |
| 5,038,376 A | 8/1991 | Mittenthal | |
| 5,214,704 A | 5/1993 | Mittenthal | |
| 5,317,639 A * | 5/1994 | Mittenthal | 380/37 |
| 5,623,549 A | 4/1997 | Ritter | |
| 5,647,001 A * | 7/1997 | Mittenthal | 380/37 |
| 5,724,428 A * | 3/1998 | Rivest | 380/37 |
| 5,778,074 A | 7/1998 | Garcken et al. | |

(Continued)

FOREIGN PATENT DOCUMENTS

| | | |
|---|---|---|
| EP | 0 503 119 A1 | 9/1992 |
| WO | WO 00/10285 * | 2/2000 |

OTHER PUBLICATIONS

Carter, G., et al., *Use of Latin Squares in the Design of Block Ciphers*, 1999.
Ritter, T., *Practical Latin Square Combiners, A Ciphers By Ritter Page*, 1998, 1-10, http://www.io.com/~ritter/ARTS/PRACTLAT.HTM.
Mittenthal, L., *Orthomorphic Block Substitutions*, p. 1-30 Revised 1994, Teledyne Electronic Systems, Newbury Park, CA.

(Continued)

*Primary Examiner*—Ayaz Sheikh
*Assistant Examiner*—Christian LaForgia
(74) *Attorney, Agent, or Firm*—Kirkpatrick & Lockhart Preston Gates Ellis LLP

(57) ABSTRACT

A method of deterministically generating maximal nonlinear block substitution tables for a predetermined block size is disclosed. The method includes selecting a first generating function and selecting a second generating function. The method also includes selecting first and second sets of complete linearly independent numbers, and calculating first and second linear orthomorphisms from the generating functions and the sets of linearly independent numbers. The method further includes creating maximal nonlinear block substitution tables by combining the linear orthomorphisms. The block substitution tables are for use in encrypting clear text messages.

14 Claims, 7 Drawing Sheets

U.S. PATENT DOCUMENTS

| | | | | |
|---|---|---|---|---|
| 5,796,837 | A * | 8/1998 | Kim et al. | 380/28 |
| 5,835,600 | A * | 11/1998 | Rivest | 380/44 |
| 6,031,911 | A * | 2/2000 | Adams et al. | 380/29 |
| 6,035,042 | A | 3/2000 | Mittenthal | |
| 6,075,865 | A * | 6/2000 | Scheidt et al. | 380/255 |
| 6,182,216 | B1 * | 1/2001 | Luyster | 713/168 |
| 6,199,162 | B1 * | 3/2001 | Luyster | 713/168 |
| 6,249,582 | B1 * | 6/2001 | Gilley | 380/28 |
| 6,578,150 | B2 * | 6/2003 | Luyster | 713/200 |
| 7,079,651 | B2 * | 7/2006 | Den Boer | 380/37 |
| 2001/0019610 | A1 * | 9/2001 | Shimoyama | 380/29 |

OTHER PUBLICATIONS

Mittenthal, *Block Substitutions Using Orthomorphic Mappings,* Advances in Applied Mathematics 16, 59-71 (1995).

Mittenthal, *Cryptographers Track Statistically Efficient Inter-Round Mixing in Block Substitution Devices,* 1996, Teledyne Electronic Technologies, Newbury Park, CA.

Johnson, D.M. et al., Canada J. Mathematics 1961, vol. 13, pp. 356-376.

Gu Dawu, Journal of Xidian University, Feb. 1999, vol. 26, No. 1 pp. 40-43.

* cited by examiner

DETERMINISTICALLY GENERATING BLOCK SUBSTITUTION TABLES WHICH MEET A GIVEN STANDARD OF NONLINEARITY

CROSS-REFERENCE TO RELATED APPLICATIONS

This application is the national stage of internationa application PCT/US99/18538, filed on Aug. 13, 1999, and claims the benefit of U.S. Provisional Application No. 60/096,535 filed on Aug. 13, 1998.

BACKGROUND OF THE INVENTION

1. Field of the Invention

The present invention is directed generally to a system and method of cryptography and, more particularly, to a system and method of cryptography that deterministically generates block substitution tables which meet a given standard of nonlinearity.

2. Description of the Background

Block substitution is a method used to encrypt a clear text message which is in the form of a sequence of binary numbers. There is considerable interest in the cryptographic community in block substitution tables or S-boxes which are highly nonlinear in some sense. This is particularly important in Feistel-type systems, of which DES is a prime example. In such systems, the key is used to interact with the clear text data and the substitution tables serve as barriers to limit access to the key by comparing clear text with cipher text data. The primary tools of cryptanalysis against Feistel-type systems are differential and linear cryptanalysis. The principal foil against these is nonlinearity as typically measured by $L_1$ and $L_4$ norms using the Walsh-Fourier transform. Emphasis on these measures is often so great that weakness in other measures is accepted in order to achieve high scores in nonlinearity. In particular, highly nonlinear tables which are weak in complexity and characterized by short cycles and multiple fixed points may be used. However, in most Feistel-type systems the tables are permanently fixed and publicly known so that these flaws are considered acceptable. Another consideration is that these highly nonlinear tables are generally found by searching and their properties are determined empirically by testing rather than relying on underlying mathematical theory.

Instead of a Feistel-type system, one can also use throwaway, secret tables for one-time use and use the cryptographic keys to generate tables, to generate inter-round mixing patterns, and effectively, to determine the algorithm rather than to merely mingle with the data. Excellent cryptographic strength can be achieved by numerous measures including cycle structure, avalanching, bit independence, perfect balance, and nonlinearity, albeit, not necessarily with the highest possible $L_1$ and $L_4$ norms.

The prior methods have the disadvantages that they are not flexible enough to meet users' needs and the substitution tables are developed by trial and error. Thus, there is a need for a cryptographic method that emphasizes designing to the customers' needs rather than offering take-it-or-leave-it products of fixed characteristics. There is also a need for a cryptographic method that can be designed to cost, designed to strength, and designed to speed, both for data rates and table generation and designed for nonlinearity. There is also a need for a cryptographic method that deterministically generates tables that do not have to be exhaustively tested.

SUMMARY OF THE INVENTION

The present invention is directed to a method of generating block substitution tables for a predetermined block size. The method includes selecting a first generating function and selecting a second generating function. The method also includes selecting first and second sets of complete linearly independent numbers and calculating first and second linear orthomorphisms from the generating functions and the sets of linearly independent numbers. The method further includes creating nonlinear block substitution tables by combining the linear orthomorphisms, the block substitution tables for use in encrypting clear text messages.

The present invention has the advantage that it deterministically generates substitution tables that do not have to be exhaustively tested. The present invention also has the advantage that it emphasizes designing to the customers' needs rather than offering take-it-or-leave-it products of fixed characteristics. The present invention has the further advantage that it can be designed to cost, designed to strength, and designed to speed, both for data rates and for table generation, and designed for nonlinearity.

BRIEF DESCRIPTION OF THE DRAWING

For the present invention to be clearly understood and readily practiced, the present invention will be described in conjunction with the following figures, wherein.

DETAILED DESCRIPTION OF THE INVENTION

A troublesome feature in discussing nonlinearity is that it has a negative definition. $F(x)$ is a linear mapping from a vector space V to another vector space U such that for any pair of vectors x and y in V and any real numbers a and b, $F(ax+by)=aF(x)+bF(y)$. This can be extended more generally to operators on Banach spaces or narrowed down to mappings or functions of the positive integers. In practice, digital data is widely used in communications and cryptography and there is much interest in nonlinear mappings of these. However, nonlinear means anything that is not linear. Mappings of the form $F(x)=ax+b$, which are termed affine by mathematicians and linear by engineers, are also generally deleted from the leftover characterization of nonlinear mappings or functions. The matter thus reduces to encrypting digital data, bit strings, bytes, blocks, or binary numbers. The process of X-ORing such numbers is widely employed because the operations $1 \oplus 0 = 1$ and $0 \oplus 0 = 0$ are so easy to implement. So no matter what these little batches of bits are called, in block encryption n such bits are taken at a time and uniquely replaced with another clump of n binary bits. Thus, for any method of block encryption used, the bijective mappings on $Z_2^n \rightarrow Z_2^n$ are examined, where $Z_2^n$ is the group of n-bit binary numbers under the group operations "⊕" of addition modulo 2 (X-ORing). There is structure in this algebraic group.

Figure 1A:
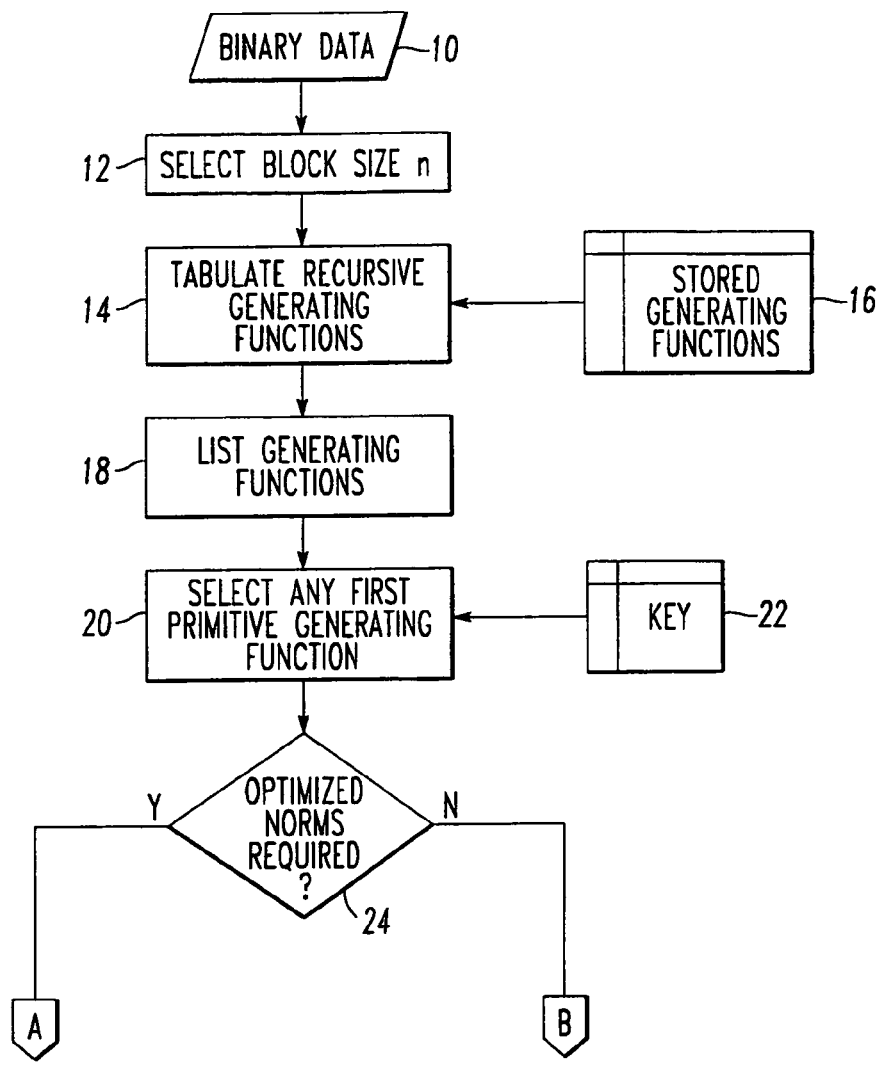
FIGS. 1A-1C are diagrams illustrating a method of finding optimized nonlinear mappings of binary numbers.
Figure 1B:
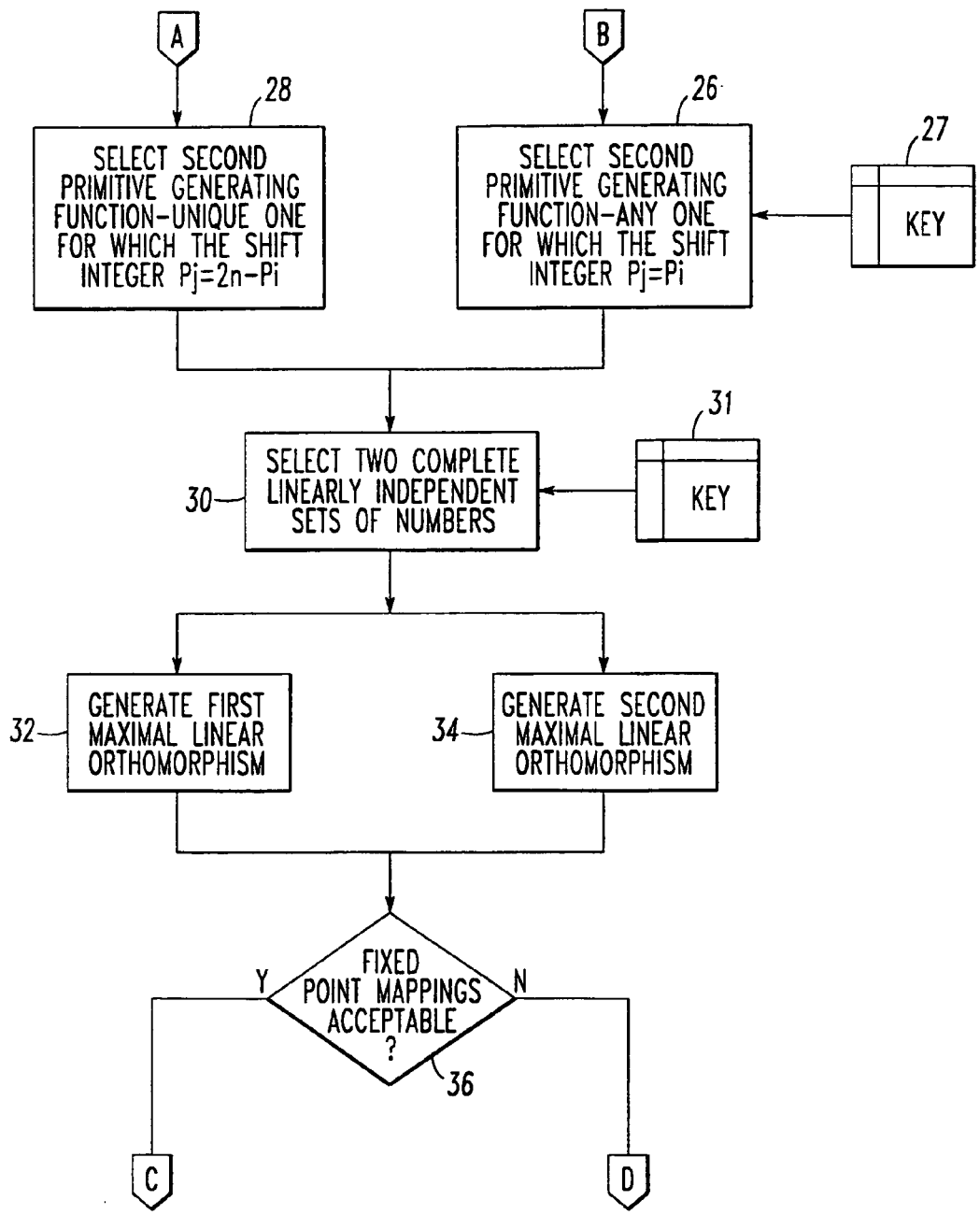
Figure 1C:
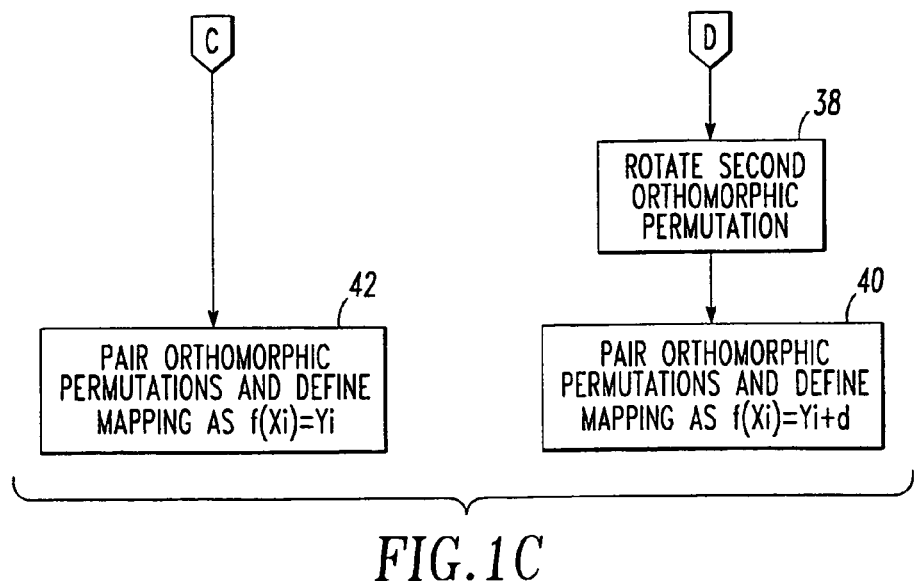

FIGS. 1A-1C are diagrams illustrating a method of finding optimized nonlinear mappings of binary numbers. FIGS. 1A-1C illustrate the case when maximal orthomorphisms (i.e. orthomorphisms having no subcycles) are used. At step 12 in FIG. 1A, data 10 to be encrypted are input and a block size is selected. Binary numbers, also known as bit strings, exist in any block size n, where n is a positive integer greater than or equal to 1. The theory upon which the present invention is based holds for any integer n greater than 1. n is typically 4 or 8.

If f(x) is any bijective, or 1-to-1 and onto, mapping from $Z_2^n$ to $Z_2^n$, a function:

$$N(x,y)=f(x) \oplus f(y) \oplus f(x \oplus y) \tag{1}$$

can be defined. This is a mapping from the product group $Z_2^n \times Z_2^n \to Z_2^n$. It is generally not onto. In fact, if f(x) is linear, by definition $N(x,y)=\theta$ (where $\theta=00...0$) for all x,y pairs. If f(x) is affine, then by definition $f(\theta)=C \neq \theta$ and $N(x,y)=f(\theta)=C$ for all $x,y \in Z_2^n \times Z_2^n$. Without loss of generality, assume that $f(\theta)=\theta$. For any mapping where $f(\theta)=C \neq \theta$, $\bar{f}(x)=f(X) \oplus C$ can be defined to obtain $\bar{f}(\theta)=\theta$. The definition of N(x,y) can also be extended to:

$$\bar{N}(x,y,\theta) \equiv f(x) \oplus f(y) \oplus f(x,y) \oplus f(\theta) = N(x,y). \tag{2}$$

$\bar{N}(x,y,\theta)$ from $Z_2^n \times Z_2^n \to Z_2^n$ is now a mapping of all subgroups $G \subset Z_2^n$ such that $|G| \leq 4$ with range in $Z_2^n$. If $x=y=\theta$, then the input is the trivial subgroup $\{\theta\}$ of order 1. If $x=y$, then $\{x, \theta\}$ is a subgroup of order 2. Otherwise, $\{x, y, x \oplus y, \theta\}$ is a subgroup of order 4.

There are $(2^n)^2=2^{2n}$ x,y pairs considering order, that is, $(x,y) \neq (y,x)$. There are $2^n$ pairs each of the form $(\theta, x)$, $(x, \theta)$ and (x,x). However, $(\theta,\theta)$ occurs in each, so that there are $3(2^n)-2$ such distinct pairs of these, each which represents a subgroup of order 1 or 2. The distinct pairs are not all unique. This leaves $2^{2n}-3(2^n)+2$ other pairs of the form (x,y) where $x \neq y \neq \theta$. Each of these defines a subgroup $\{x, y, x \oplus y, \theta\}$ of order 4. The number of such pairs is:

$$N \equiv 2^{2n}-3(2^n)+2=(2^n-1)(2^n-2) \tag{3}$$

$2|(2^n-2)$ so $2|N$. Because $3 \times (2^n)$, either $3|(2^n-1)$ or $3|(2^n-2)$. Thus, $2 \cdot 3=6|N$. Let $z=x \oplus y$. Each group of order 4 can be defined by 6 pairs: (x,y), (y,x), (x,z), (z,x), (y,z), or (z,y). This proves the following:

Proposition 1.
In $Z_2^n$ there are
$$\frac{(2^n-1)(2^n-2)}{6} = S_4 \text{ subgroups of order 4.}$$

Let $m = 2^n - 1$. Then $S_4 = \frac{m!}{6(m-2)!} = \frac{1}{3}\binom{m}{2}$ (4)

For a given mapping, one can compute all values of N(x,y). A common block size is n=8. The computer computation time is generally no more than that required for the various statistical tests. However, there are some basic ideas. Any subgroup for which $N(x,y)=\theta$ is a small linear piece. If several subgroups of order 4 take on this value for a particular mapping and form a subgroup of larger degree upon which $N(x,y)=\theta$, there is some local linearity. If there is a bias in the distribution of N(x,y) such that a disproportionally large number of subgroups have a single value, the mapping could be locally affine. Thus, it would seem that some potentially meaningful criteria would be:

1. The range of N(x,y) is $Z_2^n$
2. For any subgroup of order 4, $N(x,y) \neq \theta$
3. The distribution of N(x,y) over the subgroups of order 4 should be close to the theoretical limit of smoothness or minimal lumpiness.

To accomplish goal number 3, it would be logical to distribute the $2^n-1$ non zero values of $Z_2^n$ uniformly over the subgroups of order 4, that is, divide $S_4$ by $2^n-1$.

$$\frac{S_4}{2^n-1} = \frac{(2^n-1)(2^n-2)}{(2^n-1)6} = \frac{2^n-2}{6} \tag{5}$$

However, this is an integer if and only if n is odd because, for n odd, $n=2k+1$ and $(2^{2k+1}-2)=2(2^{2k}-1)=2(2^k-1)(2^k+1)$. This is divisible by 6 because 2 divides 2 and 3 divides either $2^k-1$ or $2^k+1$.

For example, if n=8, there are 10,795 subgroups of order 4. The closest that one could get to an even distribution of numbers assigned to subgroups would be to have 85 numbers, each of which is assigned to 43 subgroups, while the remaining 170 non zero numbers are each assigned to 42 subgroups.

On the other hand, if n=7, there are 2,667 subgroups of order 4. Each of the 127 non zero 7 bit numbers could be assigned to 21 subgroups.

In the following discussion, it is shown how to satisfy the first and third criteria above and approximate the second.

The domain of N(x,y) is the collection of subgroups of order $\leq 4$. For n=8 it would be quite tedious to enumerate all 10,795 subgroups of order 4. However, it is possible to arrange the order of the mapping $f(x_i)=z_i$ so that the algebraic relations among subgroups are clearly revealed. Typically, a mapping can be expressed as a table of integers or binary numbers as inputs paired with their encrypted images, as illustrated in Table 1.

TABLE 1

| $x_1$ | $f(x_1)$ | 1 | f(1) |
|---|---|---|---|
| $x_2$ | $f(x_2)$ or | 2 | f(2) |
| . | . | . | . |
| . | . | . | . |
| . | . | . | . |
| $x_i$ | $f(x_i)$ | i | . |
| . | . | . | . |
| . | . | . | . |
| $x_m$ | $f(x_m)$ | $2^n - 1$ | $f(2^n - 1)$ | where $m = 2^n - 1$

The subgroups of order 4 can be obtained by taking all triples consisting of pairs of numbers and their corresponding sums from the column of input integers on the left. This leads to redundancy by a factor of 6. The task is much simpler if the two columns in the table are properly reordered.

The group $Z_2^n$ of n-bit binary numbers with group operation bit wise addition modulo 2 is known to be an R-sequenceable group. (It is not R-sequenceable if the group operation is addition modulo $2^n$). Thus, orthomorphisms of the group exist. In particular, any primitive polynomial in $GF(2^n)$ corresponds to a recursive function which generates a linear orthomorphism in the form of a permutation of the integers modulo $2^n$ (or $Z_2^n$) with $\theta$ as a fixed point and a single cycle of length $2^n-1$. As illustrated in FIG. 1A at step 14, all of the linear recursive functions on $Z_2^n$ are generated and then those which are maximal (primitive polynomials) are selected. A set of generating functions 16 is stored. In a vector space, a complete linearly independent set is a collection of elements whose linear combinations generate the entire vector space. A complete linearly independent set of n-bit numbers is a set of n such numbers, all different and all non-zero, in which no member of the set is a linear combination of the other n−1 numbers. This complete linearly independent set comprises the first n numbers of the orthomorphic permutation. The recursive generating function acting on this set generates the (n+1)th number in the permutation or sequence. The same function acting on the 2d through (n+1)th numbers generates the (n+2)th number, etc. The use of recursive functions is not the only way to generate linear orthomorphisms. This can also be done algebraically. The orthomorphic permutation or ordering of the non-zero integers has the property that if $x_i \oplus x_j = x_k$ then $x_{i+d} \oplus x_{j+d} = x_{k+d}$ where the addition of the indices is modulo m, where $m=2^n-1$, and d is any integer. Thus, if $\{x_i, x_j, x_k, \theta\}$ is a subgroup, so is $\{x_{i+d}, x_{j+d}, x_{k+d}, \theta\}$. Thus, a single subgroup generates a family of subgroups all with the same relative spacings between indices. These subgroups are called similar subgroups by analogy to similar triangles. This ordering has nothing to do with the mapping. If 1, the first number in the natural order, becomes $x_i$ in the orthomorphic reordering, then $1 \to f(1)$ and $x_i = 1 \to f(x_i) = f(1)$.

A maximal linear orthomorphism, written as a permutation, has the property that:

$$x_{k-1} \oplus x_k = x_{k-p} \quad (6)$$

for all indices k. The integer p is uniquely associated with the generating function or primitive polynomial. Finding p is a computationally difficult problem, equivalent to the discrete logarithm problem. However, for n of moderate size, p can be found by searching. Once p is known, it can be used indefinitely. For a spacing s:

$$x_{k-s} \oplus x_k = x_{k-p(s)} \quad (7)$$

p(s) again depends upon the generating function and the integer s. If the orthomorphic permutation is A, then equation (7) is equivalent to the permutation $A^s$. There is some help in finding p(s). First of all, if p(s)=t, then p(t)=s.

At step 18 in FIG. 1A, the generating functions are arranged in order of their basic shift values p. These values are selected integers greater than or equal to n and less than or equal to $2^n-n$. If two shift integers $p_i$ and $p_j$ have the property that $p_i + p_j = 2^n$, then the corresponding generating functions are complementary. These complementary pairs have some special cryptographic properties. The generating functions could also be ordered lexicographically from the indices in the recursive functions. Complementary pairs could be identified in this ordering also.

Proposition 2. For a power $A^s$ of the original orthomorphism, p(2s)=2p(s).

Proof: By Definition:

$$x_{k-2s} \oplus x_k = x_{k-p(2s)} \quad (8)$$

Equation (8) can be rewritten as:

$$x_{k-s-s} \oplus x_{k-s} \oplus x_{k-s} \oplus x_k = x_{k-p(2s)} \quad (9)$$

Considering k−s as an index, the first two terms on the left can be replaced by $x_{k-s-p(s)}$, and the third and fourth terms can be replaced by the right side of equation (7). Then equation (8) becomes:

$$x_{k-s-p(s)} \oplus x_{k-p(s)} = x_{k-p(2s)} \quad (10)$$

Considering k−p(s) as an index, and applying equation (7), $x_{(k-p(s))-s} \oplus x_{(k-p(s))} = x_{(k-p(s))-p(s)}$, so that equation becomes:

$$x_{k-2p(s)} = x_{k-p(2s)} \quad (11)$$

Any family of similar subgroups is defined by its spacings, $$x_i \longrightarrow x_j \longrightarrow x_k \quad (12)$$

These are respectively (j−i), (k−i) and (k−j). Three additional spacings are the three inverses of these modulo m. Thus, each family of similar subgroups is characterized by a family of six spacings. There are $2^n-2$ such spacings. Thus, if n is odd, as shown above, $6|(2^n-2)$, and there are $$\frac{2^n - 2}{6}$$

families of similar subgroups, with $m=2^n-1$ subgroups in each family. If n is even, $$2^n - 2 = (2^n - 4) + 2 = 2(2^{n-1} - 2) + 2 \quad (13)$$

$6|(2^n-4)$ so that there are $$\frac{2^n - 2}{6}$$

families of similar subgroups plus one degenerate family with two spacings, $$\frac{m}{3} \text{ and } \frac{2m}{3},$$

each occurring three times. For example, when n=8, there are 42 families of m subgroups each, with all six spacings, plus an additional family with spacings 85 and 170 and containing $$\frac{m}{3} = 85$$

subgroups. In this latter family, the subgroups are mutually disjoint, except for $\theta$. Thus, $Z_2^8$ is decomposed into 42 families containing 255 subgroups each plus a single family of 85 disjoint subgroups of order 4. Another, and simpler example is for n=4. In this case there are two families of 15 subgroups. There are two primitive polynomials and correspondingly two generating functions or maximal linear orthomorphisms. One of these is $x_k = x_{k-4} \oplus x_{k-3}$ for which p=4. The corresponding orthomorphic permutation can be written in terms of an arbitrary complete linearly independent set, $\{x_1, x_2, x_3, x_4\}$ as follows:

$$(\theta) \, (x_1, x_2, x_3, x_4, x_1 \oplus x_2, x_2 \oplus x_3, x_3 \oplus x_4,$$
$$x_1 \oplus x_2 \oplus x_4, x_1 \oplus x_3, x_2 \oplus x_4, x_1 \oplus x_2 \oplus x_3,$$
$$x_2 \oplus x_3 \oplus x_4, x_1 \oplus x_2 \oplus x_3 \oplus x_4, x_1 \oplus x_3 \oplus x_4, x_1 \oplus x_4) \quad (14)$$

For example, if any consecutive pair is added, the sum is four positions to the right of the first member of the pair. The three families of similar subgroups can be characterized by one member each, as illustrated in Table 2.

TABLE 2

| Family I | Family II | Family III |
|---|---|---|
| $x_k, x_{k+1}, x_{k+4}$ | $x_k, x_{k+2}, x_{k+9}$ | $x_k, x_{k+6}, x_{k+11}$ |
| Spacings | Spacings | Spacings |
| 1,3,4,11,12,14 | 2,6,7,8,9,13 | 5,10 |

Family III consists of the disjoint triples: (1, 6, 11), (2, 7, 12), (3, 8, 13), (4, 9, 14), and (5, 10, 15) where the above triples are indices of $x_i$, $x_j$, $x_k$ in the subgroups. The maximal linear orthomorphism can also be written as a set of equations, as illustrated in Table 3.

TABLE 3

$$\theta \oplus \theta = \theta$$
$$x_m \oplus x_1 = x_{1-p}$$
$$x_1 \oplus x_2 = x_{2-p}$$
$$\vdots$$
$$x_{k-1} \oplus x_k = x_{k-p}$$
$$\vdots$$
$$x_{m-1} \oplus x_m = x_{m-p}$$

$m = 2^n - 1$. The middle column is the orthomorphic permutation written in column form. Each of the subgroups in Family I is represented by one of the m=15 non-trivial equations. The spacing 1 means the spacing between the indices in the left and middle columns. There are five other arrangements of the columns. Each represents a power of the basic orthomorphic permutation. For example, exchanging the left and right columns above produces a set of equations of the form:

$$x_{k-p} \oplus x_k = x_{k-1} \quad (15)$$

This represents the power $A^p$ of the original orthomorphic permutation. In the example above, p=4.

Thus, each family of subgroups, when arranged in a linear maximal orthomorphic order, represent powers of that same permutation. The power is the spacing of indices between the left and middle columns. For the recursive function above, $x_k = x_{k-4} \oplus x_{k-3}$ on $Z_2^4$, the powers of A are:

| Family I | Family II | Family III | |
|---|---|---|---|
| $A, A^3, A^4, A^{11}, A^{12}, A^{14}$ | $A^2, A^6, A^7, A^8, A^9, A^{13}$ | $A^5, A^{10}$ | (16) |

In Families I and II, adding two subgroups by respectively adding the numbers in the corresponding positions produces another triple in the same family. For example, $\{x_k, x_{k+1}, x_{k+4}\} + \{x_j, x_{j+1}, x_{j+4}\} = \{x_i, x_{i+1}, x_{i+4}\}$ where $x_k \oplus x_j = x_i$.

When two triples from Family I or two triples from Family II are added together component-wise like vector addition, the resulting triple of numbers is another from the same family with the numbers in the same order. In the case of Family III, the degenerate family, adding together two triples as described above produces another triple of numbers in the same family, but in a different order. However, the specification of the subgroup does not depend upon its order. Thus, each family is a subgroup of the product group $Z_2^4 \times Z_2^4 \times Z_2^4$. If any pair of subgroups of order 4 is combined in this way, without regard to order of group elements, e.g., $$\begin{aligned} x_a \oplus x_b &= x_c \\ x_d \oplus x_e &= x_f \\ \hline (x_a \oplus x_d) \oplus (x_b \oplus x_e) &= (x_c \oplus x_f) \end{aligned} \quad (17)$$

then the sum is clearly a subgroup and must be in one of the families or a subgroup of order 1 or 2. This pattern holds for any n even.

This same pattern holds in general, and in particular for n=8, which is a common block size for encryption. In that case there are 42 families or product groups each containing 255 subgroups of order 4 and 1 degenerate family of 85 such subgroups as mentioned above. There are 16 generating functions for maximal linear orthomorphisms in $Z_2^8$ corresponding to the 16 primitive polynomials. Any one of these is selected and the corresponding shift p is used to select the spacings for the first family of subgroups of order 4. These 6 spacings are: 1, p−1, p, m−1, m−p+1, and m−p. For the second family, any spacing is chosen, that is, any integer $1 \leq s \leq m-1$ which has not already been used. This and p(s) will generate the remaining four spacings. Selecting any s and determining the corresponding value of p(s) may require some searching. However, one s, p(s) pair will yield up to 2n−1 additional parts. Thus, finding the 42 families of subgroups is not an exhausting task.

A straightforward approach of designing to nonlinearity is first to determine the desired nonlinearity and then work backward to find a mapping that meets this requirement. For example, it would be tempting to take the family of subgroups in $Z_2^n \times Z_2^n \times Z_2^n$ of order $m = 2^n - 1$ defined by triples whose indices in the orthomorphic permutation are given by $x_k, x_{k+1}, x_{k+1-p}$. One could take the m non-zero numbers in $Z_2^n$ and assign them one each to the m triples to serve as the N(x,y) value for that subgroup. Then one could look for a mapping to fit this. But each number $x_k$ appears in three subgroups of order 4 in the product group or family, so there are constraints within the family. One cannot, in general, find a mapping which will satisfy an arbitrary assignment of values of N(x,y).

The selection of N(x,y) values in one family determine those in other families. Only one family of subgroups need be dealt with so that the task is manageable even for relatively large block sizes n.

More generally, consider any subgroup of order 4 in one of the non-degenerate product groups (family of subgroups). The subgroup, omitting the identity element θ, can be written as:

$$x_a, x_b, x_c \quad (18)$$

where $x_c = x_a \oplus x_b$ and a, b, c are the indices or positions of the respective numbers in the orthomorphic permutation. This notation can also be abbreviated as a, b, c. One could proceed as follows:

1. Assign any number to $N(x_a, x_b) \neq \theta$
2. There are m choices for $f(x_a)$ and m−1 choices for $f(x_b)$ to be consistent with the choice for $N(x_a, x_b)$. Of course, $f(x_c)$ is then fixed.

3. $x_a$, $x_b$, and $x_c$ each occur in two more places in the same family. Assuming that all values of N(x,y) have already been assigned, there are six other subgroups in the same family where there will be one choice to be made in assigning some value to $f(x_k)$ for k≠a, b or c.
4. There will be m−7 other subgroups where assignments of $f(x_k)$ must be made, starting in the same way and consistent with the first seven.
5. The other families or subgroups will be fully determined by the first.
6. This process will continue until all assignments have been made or an irresolvable snag has been encountered.

For any bijective mapping f(x) on $Z_2^n$, one could enumerate all of these subgroups, list the corresponding values of f(x), and compute N(x,y). From a set of N(x,y) values, one could work backwards to find the consistent values of $f(x_k)$. The process can be illustrated as follows:

| 1. | Choose an initial subgroup $x_a$, $x_b$, $x_c$ | where $x_c = x_a \oplus x_b$ |
|---|---|---|
| 2. | Choose N($x_a$, $x_b$) | m choices |
| 3. | Choose f($x_a$) | m choices |
| 4. | Choose f($x_b$) | at most m − 1 choices |

5. Record values of f($x_a$), f($x_b$) and f($x_c$) in other subgroups.
6. Proceed to the next subgroup, but with restricted choices. Completing one non-degenerate family will fully determine the others.
7. This process has been done successfully for n=3 but it is difficult to extend it for n≧4.

Again, for n even, one could start with the degenerate family with spacings $$\frac{m}{3} \text{ and } \frac{2m}{3}$$

where m=$2^n$−1. Let $$b = \frac{m}{3} \text{ and } c = \frac{2m}{3}.$$

The family can be written as illustrated in Table 4.

TABLE 4

| $x_1$, | $x_{b+1}$, | $x_{c+1}$ |
|---|---|---|
| $x_2$, | $x_{b+2}$, | $x_{c+2}$ |
| . | . | . |
| . | . | . |
| $x_i$, | $x_{b+i}$, | $x_{c+i}$ |
| . | . | . |
| $x_b$ | $x_c$ | $x_m$ | where $1 \leq i \leq \frac{m}{3}$.

The columns are paired with another column as illustrated in Table 5.

TABLE 5

| $x_1$ | $x_{c+1}$ | $x_{b+1}$ | $x_1$ | $x_{c+1}$ | $x_{b+1}$ |
|---|---|---|---|---|---|
| $x_2$ | $x_{c+2}$ | $x_{b+2}$ | $x_2$ | $x_{c+2}$ | $x_{b+2}$ |
| . | . | . | . | . | . |
| . | . | . | . | . | . |
| $x_b$ | $x_m$ | $x_c$ | $x_b$ | $x_m$ | $x_c$ |

The right column in each pair can be rotated and represent the mapping f(x) of the number in the left column as illustrated in Table 6.

TABLE 6

| x | f(x) | x | f(x) | x | f(x) |
|---|---|---|---|---|---|
| $x_1$ | $x_{c+1+\Delta(1)}$ | $x_{b+1}$ | $x_{1+\Delta(2)}$ | $x_{c+1}$ | $x_{b+a+\Delta(3)}$ |
| $x_2$ | $x_{c+c+\Delta(1)}$ | $x_{b+2}$ | $x_{2+\Delta(2)}$ | $x_{c+2}$ | $x_{b+2+\Delta(3)}$ |
| . | . | . | . | . | . |
| . | . | . | . | . | . |
| $x_b$ | $x_{m+\Delta(1)}$ | $x_c$ | $x_{b+\Delta(2)}$ | $x_m$ | $x_{c+\Delta(3)}$ |

This will be a bijective mapping deterministically. The numbers Δ(1), Δ(2) and Δ(3) are arbitrary fixed increments to the indices to permit rotating the right columns to avoid duplication of N(x,y) values. With a little movement up or down, it will produce $$\frac{m}{3}$$

distinct values of N(x,y). The pattern of value of N(x,y) in the other families of subgroups will be fully determined but it is difficult to predict in advance for which subgroups N(x,y)=θ and the distribution of the other values. This information can be obtained by computer analysis.

Another method is next discussed which determines and optimizes the entire N(x,y) pattern. The immediately preceding discussion gave a method of designing mappings which ensure that the range of N(x,y) has at least $$\frac{m}{3}$$

values of $Z_2^n$. The following approach obtains the full range of values and in an optimized distribution, as well.

In $Z_2^n$ the subgroups of order 4 fall naturally into families with $2^n$−1 subgroups in each. At step 20 in FIG. 1A, any primitive generating function with some shift integer p is selected and the first maximal linear orthomorphism is constructed. A generating function selector 22, which may be, for example, a key is used to select the first generating function. If the natural order of the numbers is replaced by a maximal linear orthomorphic ordering, each full family represents that orthomorphism. The family can be expressed as follows, omitting the fixed point θ:

TABLE 7

$$x_m \oplus x_1 = x_{1-p}$$
$$x_1 \oplus x_2 = x_{2-p}$$
.
.
.
$$x_{k-1} \oplus x_k = x_{k-p}$$
.
.
.
$$x_{m-1} \oplus x_m = x_{m-p}$$

The numbers in the right column are sums of the corresponding pairs in the left and middle columns. This is because they are subgroups and independent of the orthomorphism which has only determined the order of the triples, but not their contents. Next, another maximal linear orthomorphism is selected with a different generating function. This can be represented by a set of equations of the form:

TABLE 8

$$y_m \oplus y_1 = y_{1-q}$$
$$y_1 \oplus y_2 = y_{2-q}$$
.
.
.
$$y_{k-1} \oplus y_k = y_{k-q}$$
$$y_{m-1} \oplus y_m = y_{m-q}$$

q is the shift of the permutation as written in the middle column. q is uniquely associated with the generating function, so q≠p where p is the shift associated with the generating function of the first orthomorphism.

Next, the second orthomorphism is used as the mapping f(x) on the clear text numbers $x_i$ as arranged in the families of subgroups by setting $f(x_i)=y_i$ and $f(\theta)=\theta$. The set $\{y_i\}$ becomes the cipher text. This arrangement is shown pictorially as follows:

First Orthomorphic Permutation: (θ) $(x_1, x_2, \ldots,$
$x_k, \ldots, x_m)$ (19)

Second Orthomorphic Permutation: (θ) $(y_1, y_2, \ldots,$
$y_k, \ldots, y_m)$ (20)

The same mapping $x_i \rightarrow y_i$ is defined using either the left or middle columns in Tables 7 and 8. This is because in both orthomorphisms, the left column is displaced down one position from the middle column. However, in the right column the first orthomorphism is displaced by p positions and the second orthomorphism by q positions, where p≠q. Thus, the right column of the orthomorphism in Table 8 does not represent the mapping $x_i \rightarrow y_i$ because p≠q and k−p≠k−q in general. The mapping is represented in Table 9 where in each pair of rows the x value is mapped to the y value below, each x row represents the first orthomorphism and $x_{k-1} \oplus x_k = x_{k-p}$, but the y rows do not represent the second orthomorphism and $y_{k-1} \oplus y_k \neq y_{k-p}$.

TABLE 9

| $x_m$ | $x_1$ | $x_{1-p}$ |
| $y_m$ | $y_1$ | $y_{1-p}$ |
| $x_1$ | $x_2$ | $x_{2-p}$ |
| $y_1$ | $y_2$ | $y_{2-p}$ |
| . | . | . |
| . | . | . |
| . | . | . |

TABLE 9-continued

| $x_{k-1}$ | $x_k$ | $x_{k-p}$ |
| $y_{k-1}$ | $y_k$ | $y_{k-p}$ |
| . | . | . |
| . | . | . |
| . | . | . |
| $x_{m-1}$ | $x_m$ | $x_{m-p}$ |
| $y_{m-1}$ | $y_m$ | $y_{m-p}$ |

Each number $x_i$ occurs three times in this family of subgroups, that is, once in each column. There is no conflict in these assignments because the same mapping, $f(x_i)=y_i$ holds in each column.

$$N(x_{k-1}, x_k) = f(x_{k-1}) \oplus f(x_k) \oplus f(x_{k-1} \oplus x_k) \quad (21)$$

$$= f(x_{k-1}) \oplus f(x_k) \oplus f(x_{k-p}) \quad (22)$$

with the cryptographic mapping as defined above, this becomes:

$$N(x_{k-1}, x_k) = y_{k-1} \oplus y_k \oplus y_{k-p} = y_{k-q} \oplus y_{k-p} \quad (23)$$

because:

$$y_{k-1} \oplus y_k = y_{k-q} \quad (24)$$

thus:

$$N(x_{k-1}, x_k) \neq 0 \text{ because } y_{k-q} \neq y_{k-p} \quad (25)$$

If the N(x,y) values in Table 9 are tabulated, the following listing for the $2^n-1=m$ values in Table 10 are obtained.

TABLE 10

$$y_{1-q} \oplus y_{1-p} = N(x_m, x_1)$$
$$y_{2-q} \oplus y_{2-p} = N(x_1, x_2)$$
.
.
.
$$y_{k-q} \oplus y_{k-p} = N(x_{k-1}, x_k)$$
.
.
.
$$y_{m-q} \oplus y_{m-p} = N(x_{m-1}, x_m)$$

The two y columns each represent the same orthomorphic permutation with one rotated from the other by a shift of q−p=r. This can be expressed by a set of equations.

TABLE 11

$$y_{1-r} \oplus y_1 = y_{1-q(r)}$$
$$y_{2-r} \oplus y_2 = y_{2-q(r)}$$
.
.
.
$$y_{k-r} \oplus y_k = y_{k-q(r)}$$
.
.
.
$$y_{m-r} \oplus y_m = y_{m-q(r)}$$

This represents the power r of the orthomorphic permutation (θ) $(y_1, y_2, \ldots, y_m)$. Thus, by definition of an orthomorphism the set $\{y_{k-q(r)}\}$ are distinct and comprise all non-zero numbers in $Z_2^n$.

The analysis so far has considered only one of the families of subgroups of order 4. If n is odd, there are $$\frac{2^n-2}{6}-1$$

remaining such families, and if n is even, there are $$\frac{2^n-4}{6}$$

such families plus one degenerate family of $$\frac{m}{3}$$

subgroups. Consider any other non-degenerate family. As discussed hereinabove, such a family can be characterized by a common set of spacings among group elements in similar subgroups. Any such set of spacings can be represented by a set of equations as in Table 7, but this time representing some power s of the orthomorphism which determined the order of this family:

TABLE 12

$x_{1-s} \oplus x_1 = x_{1-p(s)}$
$x_{2-s} \oplus x_2 = x_{2-p(s)}$
$x_{k-s} \oplus x_k = x_{k-p(s)}$
.
.
.
$x_{m-s} \oplus x_m = x_{m-p(s)}$ The corresponding mapping has already been determined in Table 9 by $y_k=f(x_k)$. Also, $N(x_{k-s}, x_k)=f(x_{k-s}) \oplus f(x_k) \oplus f(x_{k-p(s)})=y_{k-s} \oplus y_k \oplus y_{k-p(s)}=y_{k-q(s)} \oplus y_{k-p(s)}$, as in Table 10. Because $p \neq q$ and because the family of subgroups is not degenerate, $p(s) \neq q(s)$, $y_{k-q(s)} \oplus y_{k-p(s)}$ are sums of equally spaced pairs from a maximal linear orthomorphism, for all values of k from 1 to m. Thus, each sum is distinct and $N(x_{k-s}, x_k)$ takes on all possible values except $\theta$.

If n is even, there is a degenerate family of subgroups with spacings $$\frac{m}{3} \text{ and } 2\frac{m}{3}.$$

This family corresponds to a power $A^s$ of the orthomorphism where $$s = \frac{m}{3} \text{ or } s = 2\frac{m}{3}.$$

That is, the subgroups of order 4 are arranged in the order specified by $A^s$. For all maximal linear orthomorphisms, regardless of generating function, if $$s = \frac{m}{3},$$

then $$p(s) = 2\frac{m}{3}, \text{ and if } s = 2\frac{m}{3},$$

then $$p(s) = \frac{m}{3}.$$

Referring back to Tables 11 and 12, for any row k, and $$s = \frac{m}{3} \text{ or } 2\frac{m}{3}:$$

$$y_{k-s} \oplus y_k = y_{k-q(s)} \quad (26)$$

$$x_{k-s} \oplus x_k = x_{k-p(s)} \quad (27)$$

In this special case, $q(s)=p(s)$ and $N(x_{k-s}, x_k)=y_{k-q(s)} \oplus y_{k-p(s)}=\theta$.

For example, if n=8 and $$s = 85 = \frac{255}{3}$$

then:

$$x_{k-85} \oplus x_k = x_{k+85} \quad (28)$$

and:

$$y_{k-85} \oplus y_k = y_{k+85} \quad (29)$$

for all generating functions, and $N(x_{k-85}, x_k)=y_{k-85} \oplus y_k \oplus y_{k+85}=\theta$.

This degenerate family consists of m/3 subgroups and thus m/3 values of $N(x,y)=\theta$, where $$\frac{m}{3} = \frac{(2^n-1)}{3}.$$

However, for the remaining subgroups $N(x,y) \neq \theta$, and the number of these latter subgroups is:

$$\frac{(2^n-1)(2^n-2)}{6} - \frac{(2^n-1)}{3} = \frac{(2^n-1)(2^n-4)}{6} \quad (30)$$

Thus, for n even, the ratio of subgroups for which $N(x,y)=\theta$ to subgroups for which $N(x,y) \neq \theta$ becomes:

$$2\frac{2^n-1}{(2^n-1)(2^n-4)} = \frac{1}{2^{n-1}-2} \tag{31}$$

which is $$\frac{1}{126}$$

for 8-bit numbers. However, for n odd, there are no degenerate families of subgroups and the ratio is zero, that is, for all subgroups of order 4, $N(x,y) \neq 0$ and is evenly distributed.

The procedures described hereinabove using $N(x,y)$ measure the nonlinearity of a mapping $f(x)$ of n-bit numbers to n-bit numbers. In some cases there is an interest in measuring the nonlinearity of the underlying Boolean functions. These are functions $f_i(x)$ of n-bit numbers to a single bit, in the ith bit position of the encrypted number or block. n such Boolean functions are required to represent the mapping $f(x)$ from n-bit numbers to n-bit numbers. The nonlinearity of these underlying Boolean functions is typically measured by the $L_1$ and $L_4$ norms using the Walsh-Fourier transform. At step 24 in FIG. 1A, it is determined if the nonlinear mapping to be generated must have optimized $L_1$ and $L_4$ norms in the Walsh-Fourier transform. The nonlinear mappings derived by the method of the present invention also provide very good $L_1$ and $L_4$ norms if, as at step 26 in FIG. 1B, optimized norms are not required and any one second primitive generating function is selected for which $p_j \neq p_i$. A key 27 is used to select the second generating function. However, if the theoretical optimized limit of these norms is required, this auxiliary requirement can be achieved by selecting as the second maximal linear orthomorphism that one which is derived from the primitive polynomial which is the complement of the first primitive polynomial, that is, where $p_j = 2^n - p_i$, as illustrated at step 28 in FIG. 1B. The trade off is that the choice of the second generating function is now restricted and the key size is reduced. However, the variability derived from a free choice of complete linearly independent sets supplied to the recursive generating functions is not altered.

At step 30 in FIG. 1B, two complete linearly independent sets of n-bit numbers are selected. As described hereinabove, a complete linearly independent set of n-bit numbers is one in which no member of the set is a linear combination of the other n−1 numbers. A key 31 is used to select the sets of numbers. The two sets of n-bit numbers can be selected using a number of different techniques. For example, the most general method, but not the most efficient method is as follows:

Step 1: Select arbitrarily or randomly any n-bit number. If it is not identically zero, accept it as a member of the set. There are $2^n-1$ choices.

Step 2: Similarly select any non-zero number different from the number selected in Step 1. There are $2^n-2$ choices.

Step 3: Select any non-zero number different from the numbers selected in Steps 1 and 2 and not equal to their sum. Equivalently, choose any number not in the subgroup generated by the numbers selected in Steps 1 and 2. There are $2^n-2^2$ choices.

Step 4: Choose any number not in the subgroup generated by the numbers selected in Steps 1 through 3. There are $2^n-2^3$ choices.

Continue in this manner until reaching the last step.

Step n: Choose any number not in the subgroup generated by the numbers selected in the first n−1 steps. There are $2^n-2^{n-1}=2^{n-1}$ choices.

To perform the above process deterministically, that is, to ensure that the choice made in each step is valid, the previous choices must be stored and the remaining range of valid choices for the next step must be computed. However, the n choices could be made independently without any bookkeeping or computation, and the n numbers selected could then be checked for linear independence by, for example, using the Gauss-Jordan method. This could be done quickly with the random selection. For n=8, the probability of success is 0.29. If 10 such sets were generated, the probability of success at least once is 0.97. The tradeoff between these two variations is in processing time and memory. In either case, with a random selection, all possible complete linearly independent sets are obtainable with equal probability.

Another example of a method to select the two sets of linearly independent numbers is as follows. An arbitrary n×n matrix of rank n is generated. The rows and columns by definition are complete linearly independent sets. Applying elementary row and column operations to this matrix produces new rows and columns which are again complete linearly independent sets. Inherent in this process is the restriction that no row or column can be added to itself. All possible complete linearly independent sets are theoretically reachable, but it is not obvious how many operations are needed to reach all possibilities with equal probability. U.S. Pat. No. 5,778,074 issued to Garcken et al. and entitled "Methods for Generating Variable S-Boxes From Arbitrary Keys of Arbitrary length Including Methods Which Allow Rapid Key Changes", which is incorporated herein by reference, is a special case of this in which elementary row operations only are applied to a matrix which has all ones on the main diagonal and zeroes elsewhere. With a limited key size and differential treatment of the individual rows, all complete linearly independent sets are not available or uniformly distributed. However, it is fast and does not require side computations.

Another example of a method to select the two sets of linearly independent numbers utilizes a maximal length linear orthomorphism written as a permutation of the $2^n$ n-bit binary numbers. The term "maximal length" as used in this method means that the permutation has no subcycles except a single fixed point containing just zero. Any set of or equally spaced numbers in the permutation is a complete linearly independent set. For a given fixed orthomorphism, there are $2^{n-1}-1$ distinct spacings and $2^n-1$ starting points. For n=8, this would generate 32,385 complete linearly independent sets. More sets could be obtained by using more orthomorphisms. No computation or checking is required. However, on rare occasions, the orthomorphism generated by the complete linearly independent set could be the same as the orthomorphism from which the complete linearly independent set was selected.

The methods of selecting the two sets of linearly independent numbers illustrated hereinabove are illustrative of the methods that may be used. Any of the methods illustrated or any suitable method may be used to select the two sets of linearly independent numbers.

At step 32 in FIG. 1B, a first maximal linear orthomorphism written as a permutation ($\theta$) ($x_1, x_2, x_3, \ldots$) is generated using the first set of n-bit numbers and the first generating function. At step 34, a second maximal linear orthomorphism written as a permutation ($\theta$) ($y_1, y_2,$ $y_3, \ldots$) is generated using the second set of n-bit numbers and the second generating function.

At step 36 in FIG. 1B, it is determined if mappings (block substitutions) with fixed points are acceptable. A fixed point is a block or number which is mapped to itself, i.e. not encrypted but sent in the clear. At first it would seem unacceptable to permit more than an occasional fixed point. Nevertheless, a number of S/P systems, such as DES, accept multiple fixed points. If an empirically designed S-box contains some fixed points but otherwise meets the desired measures of cryptographic strength, it is tempting to search no further.

At step 40 in FIG. 1C, the two orthomorphic permutations are paired as follows:

(θ) ($x_1, x_2, x_3, \ldots$)

($\theta(y_{1+d}, y_{2+d}, y_{3+d}, \ldots$)

The mapping is defined as $f(x_i)=y_{1+d}$, where $x_i$ is the clear text and $y_{i+d}$ is the cipher test.

At step 42 in FIG. 1C, the two orthomorphic permutations are paired as follows:

(θ) ($x_1, x_2, x_3, \ldots$)

(θ) ($y_1, y_2, y_3, \ldots$)

The mapping is defined as $f(x_i)=y_i$, where $x_i$ is the clear text and $y_i$ is the cipher text.

Because the two orthomorphic permutations have been derived from the same complete linearly independent set, rotations which eliminate other fixed points can easily be found. There are now no fixed points except $f(\theta)=\theta$. The overall variability has been slightly reduced. At step 38 in FIG. 1C, the second orthomorphic permutation is rotated by some number of positions d so that $x_i \neq y_{i+d}$ for all values of i.

Figure 2:
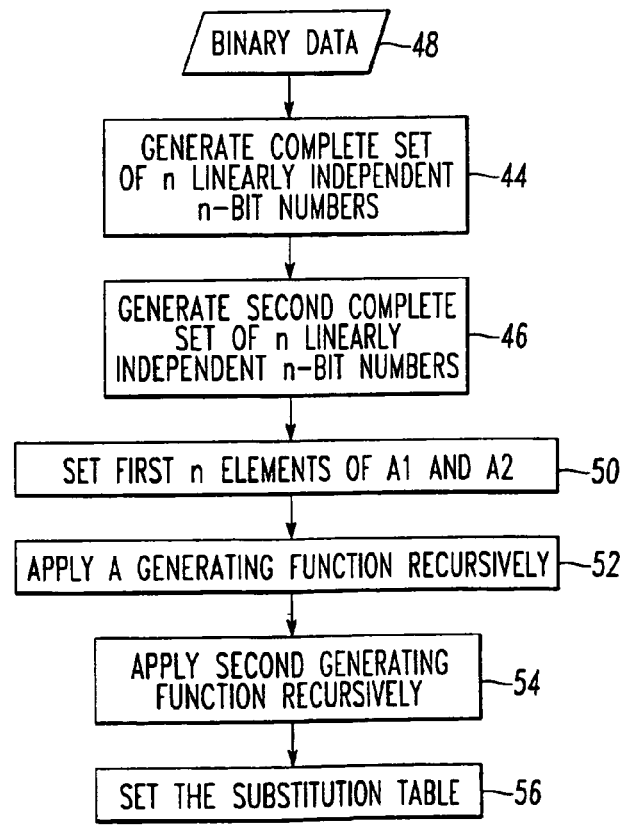
FIG. 2 illustrates an automated implementation of a method for generating nonlinear substitution tables for the general case of n-bit substitution tables.

FIG. 2 illustrates an implementation of a method for generating nonlinear substitution tables for the general case of n-bit substitution tables. At steps 44 and 46, two complete linearly independent sets of n-bit numbers CS1[1], . . . CS1[n] from n*(n-1) bits of key material and CS2[1], . . . CS2[n] from key material are generated from binary data 48. Such a set of numbers is one in which no member of the set is the sum of any of the other n-1 numbers in the same set. This is a fundamental concept in linear algebra. Such sets can be constructed in many ways, including the methods described hereinabove. At step 50, the first n elements of two arrays A1 and A2 are set as A1[0]=A2[0]=0, A1[i]=CS1[i], and A2[i]=CS2[i] for i=1 through n. At steps 52 and 54, each complete set is used, along with a recursive generating function, to generate maximal linear orthomorphisms which are special types of one-to-one mappings of some finite set onto itself. At step 52, a generating function G1 is applied recursively, using A1[i-n] through A1[i-1], to determine A1[i] for i=n+1 through $2^n-1$. At step 54, a second generating function G2 is applied recursively, using A2[i-n]

through A2[i-1] to determine A2[i] for i=n+1 through $2^n-1$. At step 56, an n-bit substitution table, consisting of $2^n$ entries, is generated such that if an element of the middle column of the first linear orthomorphism is used as an index into the substitution table, the value at that index is the corresponding element of the middle column of the second linear orthomorphism. The substitution table S is set as S[A1[i]]=A2[i] for i=0 through $2^n-1$. More specifically, let $x_1, x_2, \ldots, x_i, \ldots, x_n$ be the elements of the middle column of the first linear orthomorphism and let $y_1, y_2, \ldots y_i, \ldots, y_n$ be the elements of middle column of the second linear orthomorphism, as represented in Table 9. Then, letting S represent the substitution table:

$$S[x_i]=y_i, \text{ for i from 0 to } 2^n-1 \quad (41)$$

As an example, for n=8 (i.e., for 8-bit, 256-entry, substitution tables), there are 16 different recursive generating functions which may be used to generate the two maximal linear orthomorphisms needed for this method. The two linear orthomorphisms must be generated using two different generating functions. Table 13 lists the sixteen recursive generating functions, organized into eight complementary pairs.

TABLE 13

| Generating Function | Complementary Generating Function |
| --- | --- |
| $x_i = x_{i-8} \oplus x_{i-4} \oplus x_{i-3} \oplus x_{i-2}$ | $x_i = x_{i-8} \oplus x_{i-6} \oplus x_{i-5} \oplus x_{i-4}$ |
| $x_i = x_{i-8} \oplus x_{i-6} \oplus x_{i-5} \oplus x_{i-3}$ | $x_i = x_{i-8} \oplus x_{i-5} \oplus x_{i-3} \oplus x_{i-2}$ |
| $x_i = x_{i-8} \oplus x_{i-6} \oplus x_{i-5} \oplus x_{i-2}$ | $x_i = x_{i-8} \oplus x_{i-6} \oplus x_{i-3} \oplus x_{i-2}$ |
| $x_i = x_{i-8} \oplus x_{i-5} \oplus x_{i-3} \oplus x_{i-1}$ | $x_i = x_{i-8} \oplus x_{i-7} \oplus x_{i-5} \oplus x_{i-3}$ |
| $x_i = x_{i-8} \oplus x_{i-6} \oplus x_{i-5} \oplus x_{i-1}$ | $x_i = x_{i-8} \oplus x_{i-7} \oplus x_{i-3} \oplus x_{i-2}$ |
| $x_i = x_{i-8} \oplus x_{i-7} \oplus x_{i-6} \oplus x_{i-1}$ | $x_i = x_{i-8} \oplus x_{i-7} \oplus x_{i-2} \oplus x_{i-1}$ |
| $x_i = x_{i-8} \oplus x_{i-7} \oplus x_{i-6} \oplus x_{i-5} \oplus x_{i-2} \oplus x_{i-1}$ | $x_i = x_{i-8} \oplus x_{i-7} \oplus x_{i-6} \oplus x_{i-3} \oplus x_{i-2} \oplus x_{i-1}$ |
| $x_i = x_{i-8} \oplus x_{i-6} \oplus x_{i-4} \oplus x_{i-3} \oplus x_{i-2} \oplus x_{i-1}$ | $x_i = x_{i-8} \oplus x_{i-7} \oplus x_{i-6} \oplus x_{i-5} \oplus x_{i-4} \oplus x_{i-2}$ |

The method described in FIG. 2 works for any integer n greater than two. Also, there are many more recursive generating functions than those related to primitive polynomials. Specifically, there are $2^{n-2}$ such functions, and all can be used for this purpose. A knowledge of these recursive generating functions is a convenience, not a necessity. The same orthomorphisms can be generated algebraically and without use of the generating functions, although the latter provide an efficient mechanism. Linear orthomorphisms can also be generated from the theory of traces in Galois Fields.

Figure 3:
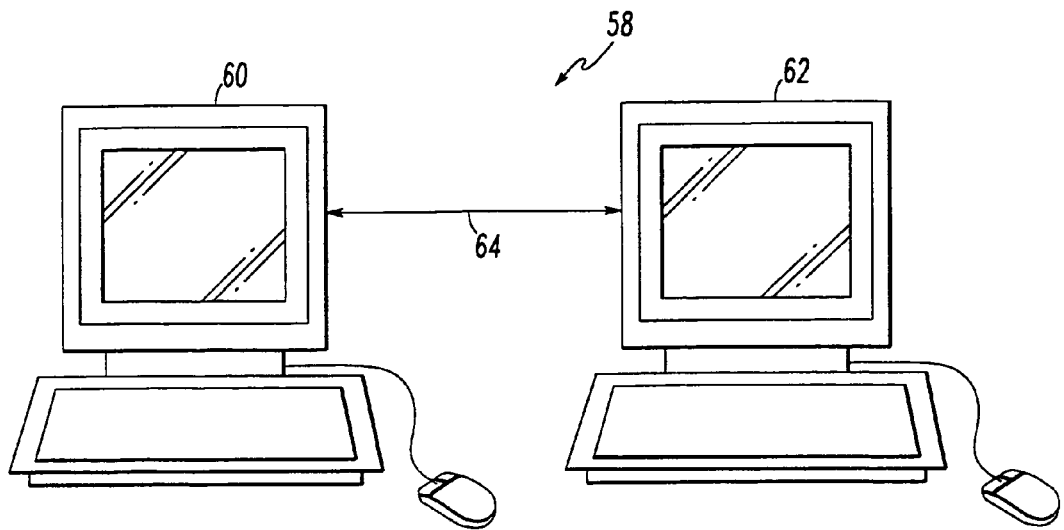
FIG. 3 is a diagram illustrating a computer system.

FIG. 3 is a diagram illustrating a computer system 58. Computers 60 and 62, which can each execute the method of the present invention, can transfer data via a communications link 64. The computers 60 and 62 may be any types of computers which have data transfer capabilities such as, for example, Apple Macintoshes, IBM compatible PCs, workstations, mainframes or minicomputers, or application-specific integrated circuits (ASICs). The communications link 64 can be any type of medium suitable to transfer data such as, for example, the Internet, a local area network, a radio frequency (RF) link, or a hardwired link.

Figure 4A:
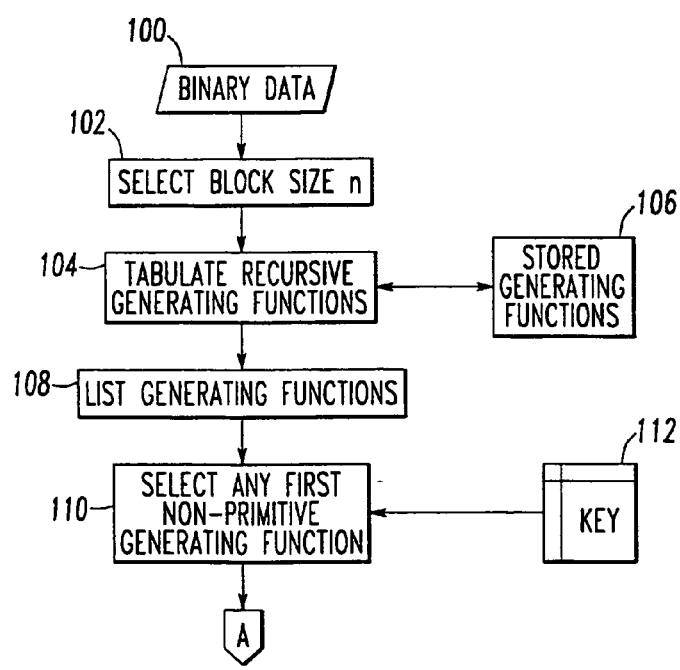
FIGS. 4A-4D are diagrams illustrating another method of finding optimized nonlinear mappings of binary numbers.
Figure 4B:
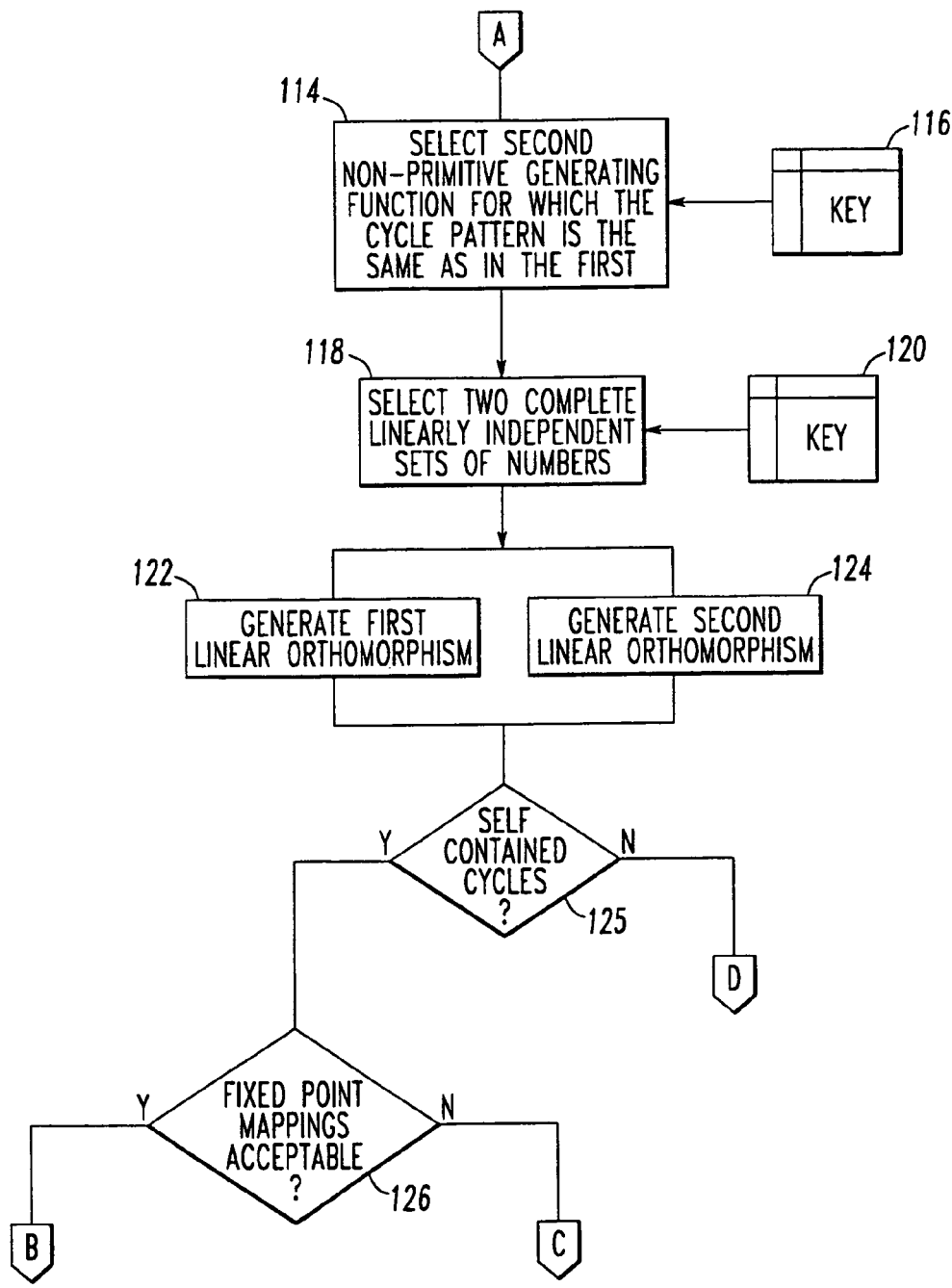
Figure 4C:
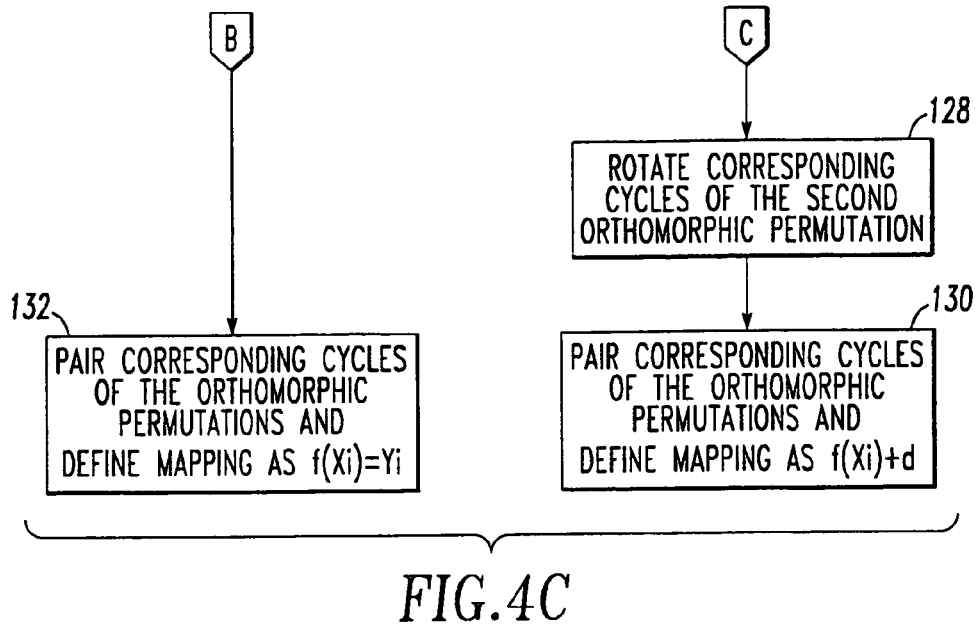
Figure 4D:
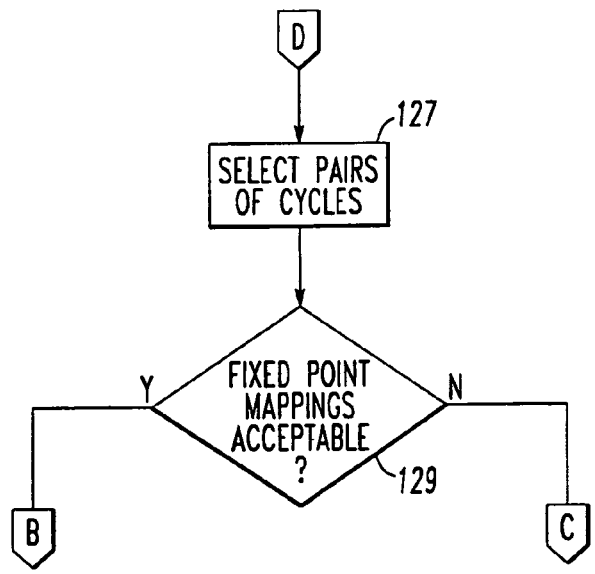

FIGS. 4A-4D are diagrams illustrating another method of finding optimized nonlinear mappings of binary numbers. The method of FIGS. 4A-4C is applicable when the linear orthomorphisms have self-contained cycles in which the sum of two consecutive numbers in a cycle is contained in that same cycle, i.e. instead of having one cycle of length $2^n-1$ and a fixed point, the orthomorphisms have sub-cycles. The orthomorphisms must have the same cycle structure, i.e. the orthomorphisms have the same number of cycles and each individual cycle pair has the same size such that they match up. The foregoing can be explained by analogy. If the orthomorphisms are analogized to pairs of wheels, or disks, the disks with the same number of entries would be paired. Each disk can be rotated with respect to the other, but each disk and each cycle must have the same number of elements.

At step 102 in FIG. 4A, a block size n of binary data 100 is selected. The block size can be selected as described hereinabove in conjunction with FIG. 1A. At step 104, the recursive generating functions are tabulated, stored as stored generating functions 106, and listed at step 108 as described hereinabove in conjunction with FIG. 1A. At step 110, any first non-primitive generating function with cycles is selected with a key 112. If n=8, there are 64 generating functions, 48 with cycles, some of which are self-contained and some of which that are not, and 16 which are maximal. Thus, at step 110, when n=8, a generating function is selected from those with cycles which are self-contained.

At step 114 in FIG. 4B, a key 116 is used to select a second non-primitive generating function for which the cycle pattern is the same as in the first generating function selected at step 110. At step 118, two complete linearly independent sets of numbers are selected using a key 120. The linearly independent sets of numbers could also be selected deterministically without using the key 120.

At steps 122 and 124, first and second linear orthomorphisms are generated, respectively. An example follows to illustrate how the linear orthomorphisms are generated. For n=8, the recursive generating function is a function of the eight numbers, or it may skip some and assign a 0 to them, but the generating function is essentially a ninth number, which is generated using numbers 1-8. A tenth number is generated using the recursive generating function and numbers 2-9, and an eleventh number is generated using the recursive generating function and numbers 3-10. When the orthomorphisms have subcycles, a portion of the orthomorphism will is generated with the complete linearly independent sets being operated on by the recursive generating function. The remainder of the orthomorphism is generated using algebraic principles. The sums of the numbers in the orthomorphism can be thought of as vectors, and thus the left number in the first vector can be added to the left number in the second one, the right number of the first one can be added to the right number of the second one, and the middle number of the first one can be added to the middle number of the second one, which yields another vector in another cycle. If the vector is in the same cycle, it is discarded. The remaining numbers in the orthomorphism are thus generated because the cycles which were generated using the generating function has a complete linearly independent set of vectors and by definition the entire group will be generated.

Another method of generating the orthomorphism with cycles is to not use the recursive generating function. First, n linearly independent numbers $(x_1, x_2, \ldots, x_n)$ are selected as is done when recursive functions are used. Next, the number $x_{n+1}$ is selected, which gives n equations of the orthomorphisms. These numbers can be used to construct n−1 equations of the linear orthomorphism:

$$\_ + x_1 = \_$$

$$x_1 + x_2 = z_2$$

$$x_2 + x_3 = z_3$$

$$x_{n-1} + x_n = z_n$$

$$x_n + \_ = \_ \tag{42}$$

These n−1 equations consist of n−1 linearly independent numbers in each column. Each such set could generate a maximal subgroup of $Z_2^n$, i.e. $2^{n-1}$ numbers which comprise half of the total. Correspondingly by taking linear combinations of these n−1 equations viewed as vectors, one could generate half of the orthomorphisms represented by such a set of equations. If a valid value of $x^{n+1}$ were assigned, an nth equation would exist:

$$x_n + x_{n+1} = z_{n+1} \tag{43}$$

With n such equations, the entire linear orthomorphism can be constructed by taking linear combinations of all n equations. The question is, what values for $x_{n+1}$ will serve to generate a valid set of equations to generate the entire orthomorphism.

The n−1 numbers $\{x_2, x_3, \ldots, x_n\}$ generate a maximal subgroup $M_0$ of $Z_2^n$. Correspondingly, the numbers $\{z_2, z_3, \ldots, z_n\}$ generate another such maximal subgroup, $R_0$. It can be shown that if $x_{n+1} \in M_0 \cap R_0$, it is a valid choice in the sense that an orthomorphism will be generated. This means that $x_{n+1}$ must not be in the subgroup $M_0$ but it must be in the subgroup $R_0$. There are $2^{n-2}$ possibilities, i.e. 64 choices if n=8. Of these 16 will produce maximal linear orthomorphisms and 48 will yield cycles. If a value for $x_{n+1}$ is chosen differently, no orthomorphism will be generated.

Alternatively, the $x_{n+1}$ number can be used to find recursive functions as described above. The choice of $x_{n+1}$ is restricted as follows. The numbers selected so far are the complete linearly independent set $\{x_1, x_2, \ldots, x_n\}$. Omitting $x_1$, the remaining n−1 numbers $\{x_2, \ldots, x_n\}$ generate a maximal subgroup. $x_{n+1}$ must be in the complement of that subgroup. There are n−1 equations initially generated:

$$x_1 + x_2 = z_2 \tag{44}$$

$$\vdots$$

$$x_{n-1} + x_n = z_n$$

$x_{n+1}$ must also be in the subgroup generated by $\{z_2, \ldots, z_n\}$.

At step 125 in FIG. 4B, it is determined whether the cycles are all self-contained. If the cycles are not self-contained, the flow proceeds to step 127 of FIG. 4D, where pairs of cycles are selected from the first and second orthomorphisms, respectively so that N(x,y), defined below, takes on all possible values except zero.

When the cycles are not self-contained, the sums of consecutive pairs of numbers in one cycle will be in another cycle. Because the starting point of a cycle in a permutation is arbitrary, it is not possible to derive a shift distance, e.g. (1234) is the same as (2341). However, it is still possible to identify complementary orthomorphisms because the complementary generating functions can be identified.

A common example can be illustrated for the case when n=8 and there are $2^n - 1 = 255$ such nonzero binary numbers. On occasion, linear orthomorphisms will occur in three non-self contained cycles of 85 numbers each. The cycles can be represented as: $(\theta)(x_1 x_2 \ldots x_{85})(y_1 y_2 \ldots y_{85})(z_1 z_2 \ldots z_{85})$. Representing these orthomorphic permutations as arrays of equations, one has:

cycle 1  $x_{85} \oplus x_1 = y_1$  (45)
$x_1 \oplus x_2 = y_2$
$\vdots \quad \vdots$
$x_{84} \oplus x_{85} = y_{85}$ cycle 2  $y_{85} \oplus y_1 = z_1$  (46)
$y_1 \oplus y_2 = z_2$
$\vdots \quad \vdots$
$y_{84} \oplus y_{85} = z_{85}$ cycle 3  $z_{85} \oplus z_1 = x_p$  (47)
$z_1 \oplus z_2 = x_{p+1}$
$\vdots \quad \vdots$
$z_{84} \oplus z_{85} = x_{p+84}$ Because the order of the x's was set in cycle 1, it cannot be arbitrarily reassigned in cycle 3. This integer p is analogous in the shift in orthomorphisms with only self-contained cycles. Designating this as orthomorphism 1, note that for $x_i$ and $x_{i+1}$ in cycle 1, the sums $y_{i+1}$ are in cycle 2. Similarly, the sums of consecutive numbers in cycles 2 and 3 are respectively in cycles 3 and 1.

A second linear orthomorphism of the same form can be represented as follows:

cycle 1  $u_{85} \oplus u_1 = v_1$  (48)
$u_1 \oplus u_2 = v_2$
$\vdots \quad \vdots$
$u_{84} \oplus u_{85} = v_{85}$ cycle 2  $v_{85} \oplus v_1 = w_1$  (49)
$v_1 \oplus v_2 = w_2$
$\vdots \quad \vdots$
$v_{84} \oplus v_{85} = w_{85}$ cycle 3  $w_{85} \oplus w_1 = u_p$  (50)
$w_1 \oplus w_2 = u_{p+1}$
$\vdots \quad \vdots$
$w_{84} \oplus w_{85} = u_{p+84}$ The nonlinearization can be accomplished by using orthomorphism 1 as the clear text numbers and orthomorphism 2 as the cipher text numbers, as usual. However, instead of having a single method $x_i \rightarrow f(x_i) = y_i$, with possible rotation of one orthomorphic permutation with respect to the other, there are now multiple possibilities.

When the value $f(x_i)$ is assigned as the encrypted value of $x_i$, the numbers are assigned to encrypt the middle column of numbers $x_i$ in the array of equations. The numbers in the left column are encrypted by the assignments made in the middle column or position of the previous equation. The numbers in the right column are encrypted by subsequent assignments in the middle column further down for self-contained cycles, and in the middle column of another cycle in the non self-contained case.

The essential requirement is that $N(x,y) \equiv f(x_{i-1}) \oplus f(x_i) \oplus f(x_{i-1} \oplus x_i) \neq \theta$ most of the time and that N(x,y) takes on all nonzero values. In the present case, there are more choices to make than simply a rotation of cycles.

The following procedure is an example of handling cycles which are not self-contained. This example is for the common case of n=8 with three equal length cycles.

Encrypt cycle 1 of orthomorphism 1 with cycle 3 of orthomorphism 2:

$$f(x_i) = w_k \text{ for some k} \quad (51)$$

Encrypt cycle 2 of orthomorphism 1 with cycle 2 of orthomorphism 2:

$$f(y_i) = v_k \text{ for some k} \quad (52)$$

Encrypt cycle 3 of orthomorphism 1 with cycle 1 of orthomorphism 2:

$$f(z_i) = u_k \text{ for some k} \quad (53)$$

Consider the encryption of cycle 1:

$$N(x_{i-1}, x_i) = f(x_{i-1}) \oplus f(x_1) \oplus f(x_{i-1} \oplus x_i) \quad (54)$$
$$= w_{k-1} \oplus w_k \oplus f(y_i)$$
$$= u_{p+k-1} \oplus v_k \neq \theta$$

Because u is in cycle 1 and v is in cycle 2 of orthomorphism 2, they must be different, but $u \oplus y = \theta$ implies that u=v.

For the encryption of cycle 2:

$$N(y_{i-1}, y_i) = f(y_{i-1}) \oplus f(y_1) \oplus f(y_{i-1} \oplus y_i) \quad (55)$$
$$= v_{k-1} \oplus v_k \oplus f(z_i)$$
$$= w_k \oplus u_k \neq \theta$$

for the same reason.

For the encryption of cycle 3:

$$N(z_{i-1}, z_i) = f(z_{i-1}) \oplus f(z_1) \oplus f(z_{i-1} \oplus z_i) \quad (56)$$
$$= u_{k-1} \oplus u_k \oplus f(x_{p+i-1})$$
$$= v_k \oplus w_j \neq \theta$$

for the same reason.

However, when matching pairs of cycles to define the encryption pattern, rotation may be necessary to eliminate fixed points, but the nonlinearity is independent of the rotation. Other methods of assigning the mapping $x \rightarrow f(x)$ require rotation of cycles to avoid $N(x_{i-1}, x_i) = \theta$.

The flow then proceeds to step 129, where it is determined if fixed point mappings are acceptable. The flow then proceeds to either step 132 or 128, which are described hereinbelow.

If the cycles are self-contained as determined at step 125, the flow proceeds to step 126 where it is determined whether fixed point mappings are acceptable and, if not, the flow proceeds to step 128 of FIG. 4C. At step 128, the corresponding cycles of the second orthomorphic permutation are rotated. Then, at step 130, the corresponding cycles of the orthomorphic permutations are paired and the mapping is defined as $f(X_i) = Y_i + d$. If fixed point mappings are acceptable as determined at step 126, the flow moves to step 132, where the corresponding cycles of the orthomorphic permutations are paired and the mappings are defined as $f(X_i) = Y_i$.

This ensures that non-self contained cycles are matched such that N(x,y)≠0. This cannot be done arbitrarily.

Figure 5:
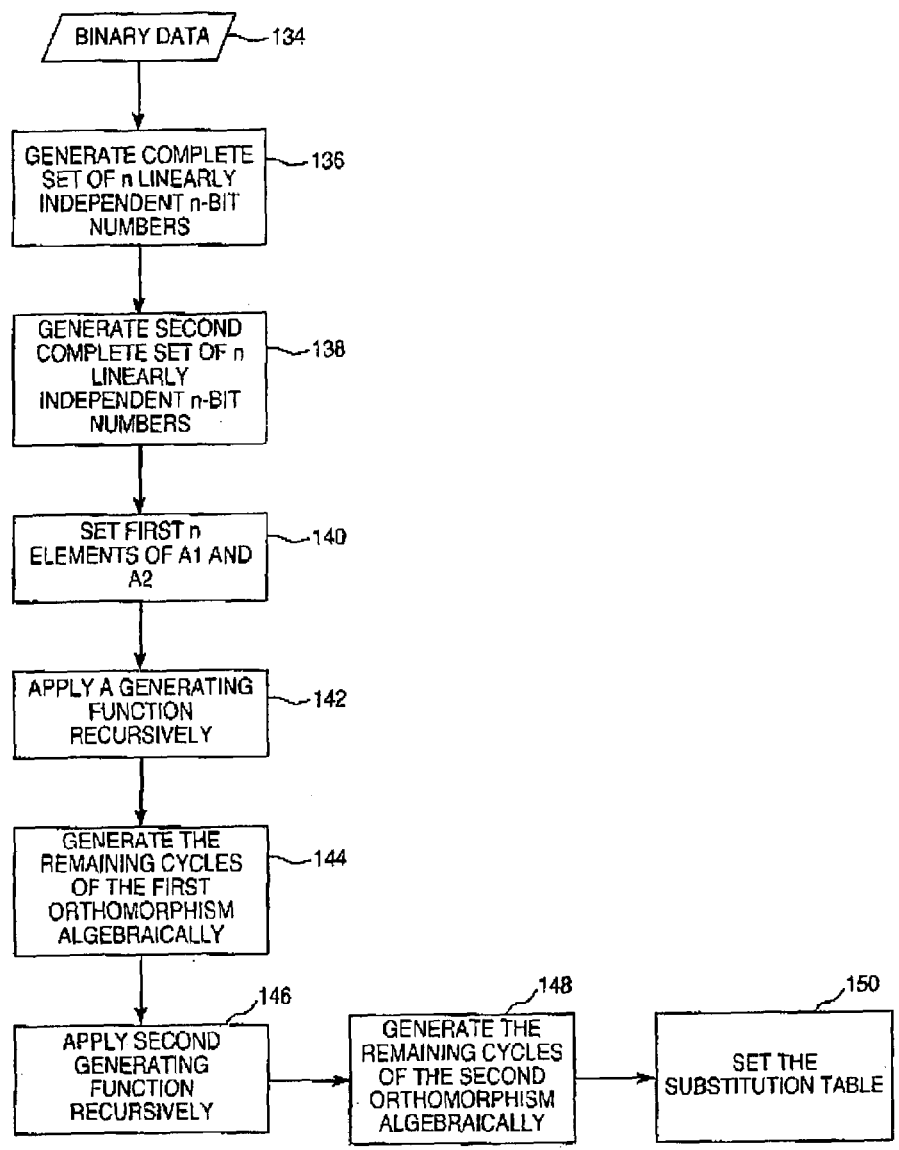
FIG. 5 illustrates an automated implementation of another method for generating nonlinear substitution tables for the general case of n-bit substitution tables.

FIG. 5 illustrates an automated implementation of another method for generating nonlinear substitution tables for the general case of n-bit substitution tables. At step 136, a complete set of n linearly independent n-bit numbers is generated from binary data 134 as described hereinabove in conjunction with FIG. 2. At step 138, a second complete set of n linearly independent n-bit numbers is generated. At step 140, the first n elements of A1 and A2 are set and at step 142 a generating function is applied recursively to generate a major cycle of the first orthomorphism. Alternatively, the major cycle can be generated algebraically, as described hereinabove. Steps 140 and 142 are performed as in FIG. 2.

At step 144, the remaining cycles of the first orthomorphism are generated algebraically as discussed hereinabove in conjunction with FIG. 4B. At step 146, the second generating function is recursively applied to generated a major cycle of the second orthomorphism. At step 148, the remaining cycles of the second orthomorphism are generated algebraically as discussed hereinabove in conjunction with FIG. 4B. At step 150, the substitution table is set by taking all the pairs of matching cycles and grouping them together, using one cycle as the input and the other as the output.

While the present invention has been described in conjunction with preferred embodiments thereof, many modifications and variations will be apparent to those of ordinary skill in the art. The foregoing description and the following claim are intended to cover all such modifications and variations.

I claim:

1. A method of deterministically generating maximal nonlinear block substitution tables for a predetermined block size, comprising:
    selecting a first generating function;
    selecting a second generating function;
    selecting first and second sets of complete linearly independent numbers;
    calculating first and second linear orthomorphisms from the generating functions and the sets of linearly independent numbers;
    creating a maximal nonlinear block substitution table by combining the linear orthomorphisms; and
    encrypting a clear text message utilizing the block substitution table.

2. The method of claim 1, wherein selecting a first generating function includes selecting a first primitive generating function.

3. The method of claim 1, wherein selecting a second generating function includes selecting a second primitive generating function.

4. The method of claim 1, wherein calculating first and second linear orthomorphisms includes calculating first and second maximal linear orthomorphisms from the generating functions and the sets of linearly independent numbers.

5. The method of claim 1, further comprising rotating the second linear orthomorphism.

6. The method of claim 5, wherein rotating the second linear orthomorphism includes rotating corresponding cycles of the second linear orthomorphism.

7. The method of claim 1, wherein selecting a second generating function includes selecting a second generating function which is a complement of the first generating function.

8. The method of claim 1, wherein selecting first and second sets of linearly independent numbers includes selecting a second set of linearly independent numbers that is identical to the first set of linearly independent numbers.

9. The method of claim 1, wherein selecting first and second sets of linearly independent numbers includes selecting a second set of linearly independent numbers that is not identical to the first set of linearly independent numbers.

10. A computer-implemented method for deterministically generating maximal nonlinear block substitution tables from binary data, comprising:
    selecting a first set of a plurality of complete linearly independently numbers from the binary data;
    selecting a second set of a plurality of complete linearly independent numbers from the binary data;
    generating a plurality of linear orthomorphisms using first and second recursive generating functions and the first and second sets of linearly independent numbers;
    setting a maximal nonlinear substitution table based on a combination of the linear orthomorphisms; and
    encrypting a clear text message utilizing the substitution table, wherein the clear text message is in the form of a sequence of binary numbers.

11. The method of claim 10, wherein the second generating function is a complement of the first generating function.

12. A system, comprising:
    a communications link;
    a first computer in communication with the communications link; and
    a second computer in communications with the communications link, the second computer having an ordered set of data and instructions stored thereon which, when executed by the second computer, cause the second computer to perform the steps of:
    selecting a first generating function;
    selecting a second generating function;
    selecting first and second sets of complete linearly independent numbers;
    calculating first and second linear orthomorphisms from the generating functions and the sets of linearly independent numbers; and
    creating maximal nonlinear block substitution tables by combining the linear orthomorphisms, the block substitution tables for use in encrypting clear text messages.

13. A computer-readable medium having stored thereon instructions which, when executed by a processor, cause the processor to perform the steps of:
    selecting a first generating function;
    selecting a second generating function;
    selecting first and second sets of complete linearly independent numbers;
    calculating first and second linear orthomorphisms from the generating functions and the sets of linearly independent numbers;
    creating a maximal nonlinear block substitution table by combining the linear orthomorphisms; and
    encrypting a clear text message utilizing the block substitution table.

14. A computers system for deterministically generating maximal nonlinear block substitution tables for a predetermined block size, the system comprising a computer, wherein the computer is configured to perform the steps of
    selecting a first generating function;
    selecting a second generating function;

selecting first and second sets of complete linearly independent numbers;

calculating first and second linear orthomorphisms from the generating functions and the sets of linearly independent numbers; and creating a maximal nonlinear block substitution table by combining the linear orthomorphisms, the block substitution tables for use in encrypting a clear text message.

\* \* \* \* \*

UNITED STATES PATENT AND TRADEMARK OFFICE
CERTIFICATE OF CORRECTION

PATENT NO. : 7,292,693 B1
APPLICATION NO. : 09/762555
DATED : November 6, 2007
INVENTOR(S) : Lothrop Mittenthal It is certified that error appears in the above-identified patent and that said Letters Patent is hereby corrected as shown below:

Column 1, line 9, delete "internationa" and replace therewith --international--.

Column 1, line 11, delete "benefite" and replace therewith --benefit--.

Column 3, line 24, delete "f(X) ⊕ C" and replace therewith --f($x$) ⊕ C--.

Column 3, line 44, delete "3 x (2.)" and replace therewith --3 $X$ ($2_n$)--.

Column 10, line 21, delete "$X_{b + a + \Delta (3)}$" and replace therewith --$X_{b + 1 + \Delta (3)}$--.

Column 10, lines 22, delete "$X_{c + c + \Delta (1)}$" and replace therewith --$X_{c + 2 + \Delta (3)}$--.

Column 14, lines 50-51, delete "This degenerate family consists of m/3 subgroups and thus m/3 values" and replace therewith --This degenerate family consists of $\frac{m}{3}$ subgroups and thus $\frac{m}{3}$ values--.

Signed and Sealed this

Second Day of September, 2008

JON W. DUDAS
*Director of the United States Patent and Trademark Office*